(12) United States Patent
Galloway

(10) Patent No.: US 8,823,427 B1
(45) Date of Patent: Sep. 2, 2014

(54) UNIT ELEMENT RAMP GENERATOR FOR ANALOG-TO-DIGITAL CONVERTER

(75) Inventor: Brian Jeffrey Galloway, Hoschton, GA (US)

(73) Assignee: Foveon, Inc., Santa Clara, CA (US)

( * ) Notice: Subject to any disclaimer, the term of this patent is extended or adjusted under 35 U.S.C. 154(b) by 0 days.

(21) Appl. No.: 12/819,005

(22) Filed: Jun. 18, 2010

(51) Int. Cl.
- G11C 27/02 (2006.01)
- H03K 17/00 (2006.01)
- H03K 4/02 (2006.01)
- H03K 4/06 (2006.01)
- H03K 4/90 (2006.01)

(52) U.S. Cl.
USPC .......... 327/126; 327/124; 327/127; 327/131; 327/133; 327/134; 327/136; 327/94

(58) Field of Classification Search
USPC .......... 327/94–96, 124, 126, 127, 131, 133, 327/134, 135, 137; 341/126, 155
See application file for complete search history.

(56) References Cited

U.S. PATENT DOCUMENTS

| | | | |
|---|---|---|---|
| 4,794,333 A * | 12/1988 | Milkovic | 324/142 |
| 4,988,900 A | 1/1991 | Fensch | |
| 5,321,404 A | 6/1994 | Mallinson et al. | |
| 6,545,624 B2 | 4/2003 | Lee et al. | |
| 6,885,331 B2 | 4/2005 | Krymski | |
| 7,095,355 B1 * | 8/2006 | Graham et al. | 341/169 |
| 7,218,265 B2 | 5/2007 | Roh et al. | |
| 7,424,275 B2 * | 9/2008 | Somayajula | 455/114.2 |
| 7,755,531 B2 * | 7/2010 | Yeom | 341/166 |
| 7,907,079 B1 | 3/2011 | Galloway et al. | |
| 2006/0125673 A1 | 6/2006 | Lee | |
| 2006/0220941 A1 | 10/2006 | Lee | |

FOREIGN PATENT DOCUMENTS

| | | |
|---|---|---|
| JP | 02222324 | 9/1990 |
| JP | 2007143099 A | 6/2007 |
| JP | 2009201113 A | 9/2009 |

* cited by examiner

*Primary Examiner* — Lincoln Donovan
*Assistant Examiner* — Colleen O Toole
(74) *Attorney, Agent, or Firm* — The Webb Law Firm (57) ABSTRACT

A method for generating a ramp comprises providing a voltage reference source, providing a summing amplifier, providing n switched capacitor elements coupled in parallel between the voltage reference source and the summing amplifier, and selectively activating a predetermined number of the switched capacitor elements to first store charge on each activated switched capacitor element and then to measure the sum of the charges on the activated capacitor switch elements in each of a fixed-integer number of time slots in a cyclical manner, the predetermined number being between 0 and n.

16 Claims, 5 Drawing Sheets

UNIT ELEMENT RAMP GENERATOR FOR ANALOG-TO-DIGITAL CONVERTER

BACKGROUND

Field of the Invention

The Prior Art

The present invention relates to analog-to-digital converters ("ADC's") and to companding analog-to-digital converters, an architecture commonly known as "single slope ADC's". More particularly, the present invention relates to apparatus and methods to minimize nonlinearity in analog-to-digital converters.

"Single slope ADC's" is the common name given to a family of analog-to-digital converters employing a ramp voltage generator, a digital counter, an analog front end sampling section, a comparator that compares the analog input voltage with the generated ramp voltage, and a digital latch.

Figure 1A:
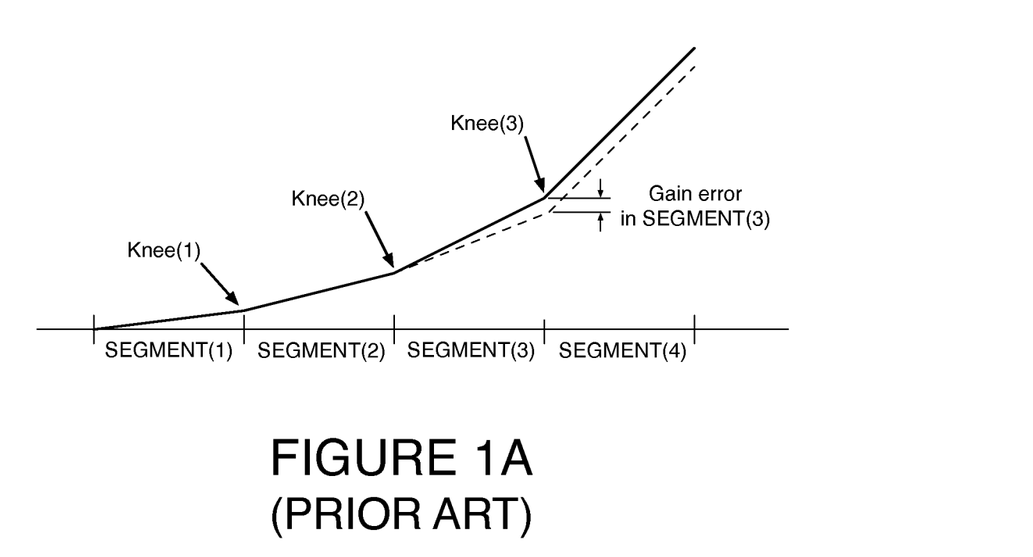
FIG. 1A is a representation of a multi-slope output from a ramp generator in which the slopes of successive ramp segments double.

In a simple well-known case, the ramp voltage follows a linear function. To reduce the conversion time, the ramp voltage may be "accelerated" by using a segmented ramp function as shown in FIG. 1A. Initially, in SEGMENT(1) the ramp in FIG. 1A runs with a unit step size (STEP(1)=1*LSB or 1× ramp rate). After a specified number of clock pulses, in SEGMENT(2) the ramp rate is increased to twice the unit step size (STEP(2) or 2× ramp rate). The count at which the transition from STEP(1) to STEP(2) occurs is may be referred to as Knee(1). After counting for a certain number of steps at a 2× ramp rate, the rate is doubled again in SEGMENT(3) to STEP(4) or a 4× ramp rate. This occurs at a count that may be referred to as Knee(2). Further doubling in SEGMENT(4) results in STEP(8) at count Knee(3). At the same knee points the ramp counter increases the count steps size by 2× so that the overall ADC transfer function is linear. Companding is also done in the prior art to take advantage of the fact that the absolute level of the noise in most natural source signals increases with the signal value so that increased ADC quantization noise at larger input signal values is masked by input noise and thus the "quality" (SNR) of the ADC conversion does not decrease at higher levels. Image sensors are an example of such an application.

Figure 1B:
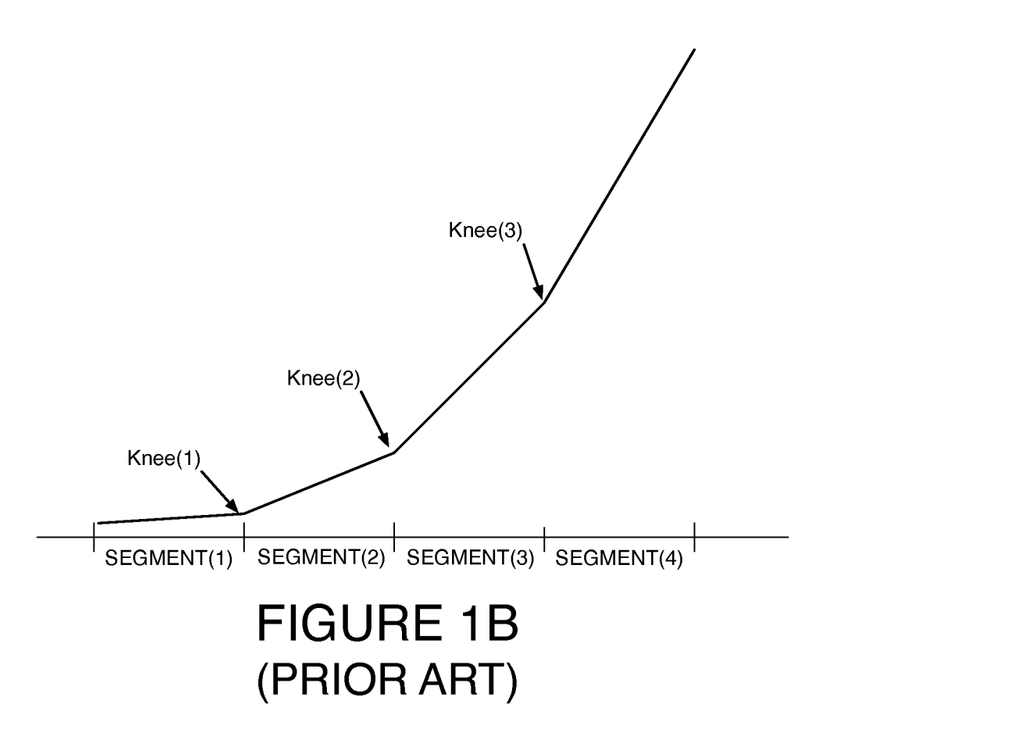
FIG. 1B is a representation of a more general multi-slope output from a ramp generator in which the slopes of successive ramp segments are different from one another.

Persons of ordinary skill in the art will readily appreciate that the acceleration of the ramp voltage need not be limited to integer multiples (e.g., 2×) but may be configured in virtually any manner as warranted by the particular application. Such an alternative scheme is shown in FIG. 1B, in which the individual ramp segments SEGMENT(1) through SEGMENT(4) may have slopes that are not integer multiples of one another.

In real world implementations, non-idealities such as charge injection, amplifier offset, finite amplifier gain, and component mismatch cause each of the SEGMENT(N) sections to have unpredictable ramp rates. In the general case, the difference from the intended step size may be independent for each SEGMENT so that the composite transfer function (digital number out vs. $V_{in}$) may be non-linear. In addition, these circuit non-idealities (such as amplifier offset) may drift over the lifetime of the circuit. STEP(1) through STEP(4) and Knee(1) through Knee(3) are illustrated in SEGMENT(1) through SEGMENT(4) in FIG. 1A. A non-ideal gain for SEGMENT(3) is shown in FIG. 1A along with an ideal SEGMENT(3). It can be seen from FIG. 1A that a non-ideal gain for a single section can cause integral non-linearity (INL). Correct linearity for the ADC assumes that the gain for STEP (4) is half of that of STEP(8) and twice that of STEP(2). However, a sampled voltage during SEGMENT(4) will not have a count that corresponds linearly to a voltage sampled during STEP(2) or STEP(8). Because only part of the voltage versus count curve has non-ideal gain, integral non-linearity results. If all sections were affected in the same way, an overall gain error would occur but the transfer function would be linear.

In order to have low integral non-linearity over the entire ramp, the ramp gains (expressed in Volts/digital number, Amps/digital number or other measured quantity) for each section must be accurate. Actually, for applications such as imaging or in the general case, applications including some form of AGC function in the system, only the ratios of the gains need to be accurate for a low integral non-linearity. If the overall gain is also of interest, accurate gain for each section is desired.

Figure 2:
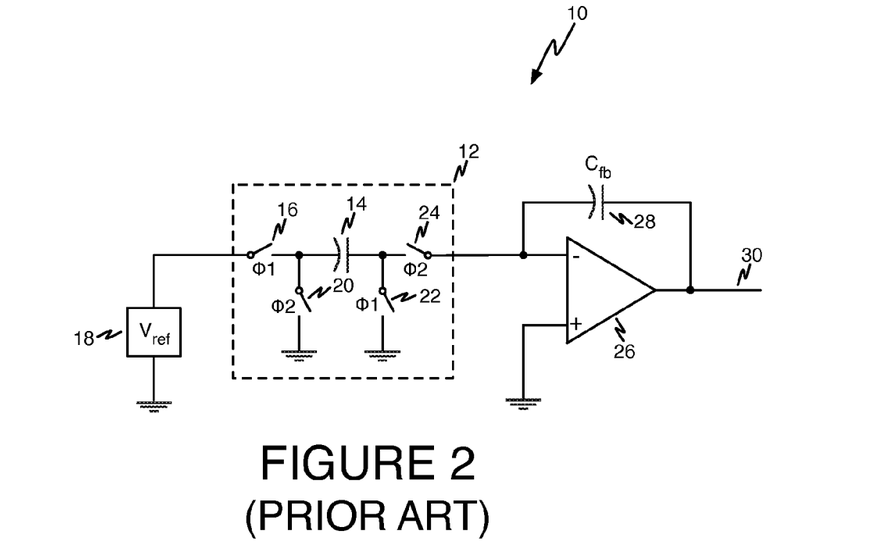
FIG. 2 is a simplified schematic diagram of a typical prior-art ramp generator circuit.

As shown in FIG. 2, a typical ramp generator circuit 10 may be implemented as a switched capacitor integrator. Ramp generator circuit 10 includes a switched capacitor network shown inside of dashed line 12 that includes capacitor 14. A switch 16 couples capacitor 14 to $V_{ref}$ source 18. Switch 20 couples the first plate of capacitor 14 to ground and switch 22 couples the second plate of capacitor 14 to ground. Switch 24 couples the second plate of capacitor 14 to the inverting input of operational amplifier 26. Feedback capacitor ($C_{fb}$) 28 is coupled between the output 30 and the inverting input of operational amplifier 26. Switches 16 and 24 allow the unit element 12 to be selectively switched in and out of the ramp generator circuit 10. In addition, other methods may be used to deliver quanta of charge to the input of an amplifier with capacitor feedback.

The switched capacitor network 12 at the input of the amplifier 26 delivers discrete packets of charge to the amplifier 26. The amplifier 26 has a capacitive feedback network 28 configured to provide negative feedback. The feedback forces the amplifier 26 to move the ramp output voltage in order to re-balance the inputs after each packet of charge is delivered. The size of the ramp step is proportional to the input voltage from a voltage source, such as a resistor ladder, and the ratio of the input capacitance to the output capacitance. One or both of the input voltage and the size of the input capacitance may be programmable. Persons of ordinary skill in the art will understand that other methods may be used to implement the ramp generator, such as a DAC or a continuous integrator driven by a constant current source. In addition, other methods may be used to define quanta of charge to the input of the amplifier with capacitive feedback.

Figure 3:
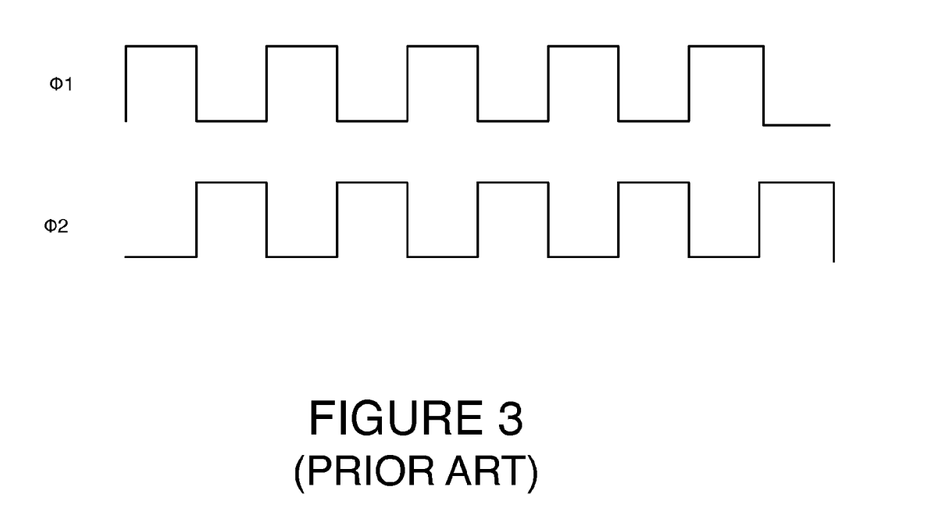
FIG. 3 is a timing diagram showing the operation of the switches in the ramp generator circuit of FIG. 2.

Referring now to FIG. 3, a timing diagram shows the operation of the switches in the ramp generator circuit of FIG. 2. Two clock signals, $\phi 1$ and $\phi 2$, having opposing phase relationship are used to drive the switches in switched capacitor network 12. The $\phi 1$ signal drives switches 16 and 22, and the $\phi 2$ signal drives switches 20 and 24 as is known in the art. During $\phi 1$, switches 16 and 22 are closed, charging capacitor 14 to $V_{ref}$. During $\phi 2$, switches 20 and 24 are closed, transferring the charge from capacitor 14 to the inverting input of amplifier 26.

Figure 4:
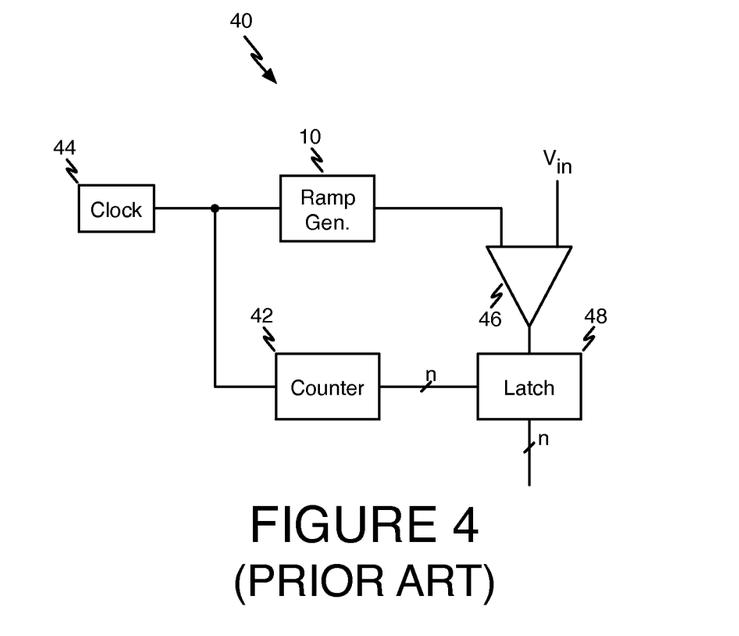
FIG. 4 is a block diagram of a prior-art analog-to-digital converter.

Referring now to FIG. 4, a schematic diagram shows how the ramp generator 10 of FIG. 2 may be used in an analog-to-digital converter 40, in which the ramp generator 10 is associated with a counter 42 driven from the same clock source 44 as the ramp generator 10. The output count of the counter 42 has a known relationship to the ramp voltage. An analog input voltage and the ramp voltage are compared in a comparator 46 and the output of the comparator 46 is used to trigger latch 48 to latch the output of the counter 42 when the ramp voltage equals the analog input voltage. The latched count, which has a known relationship to the ramp voltage, is thus a digital representation of the measured analog input quantity.

The major sources of error in the ramp gain of circuits such as the one depicted in FIG. 4 arise from the input offset of the ramp amplifier 26 and a differential charge injection error. The step size of the ramp generator (and therefore the gain in V/digital number) is proportional to the amount of charge injected at each step. For each possible setting, the step size is given a constant error by the charge injection. The offset of the amplifier gives an error that is proportional to the amount of capacitance used for the particular setting. The error due to capacitance mismatch will result in an error that is proportional to the input voltage. There may also be also errors in the reference voltages $V_{in}$ and $V_{ref}$ used by the ramp generator that must be considered. Lastly, the finite amplifier gain will cause an error that is proportional to the output voltage, which creates a non-linearity in the ramp voltage. The total error in the ramp gain of circuits such as the one depicted in FIG. 2 is $Q_{err}=Q_{inj}+Q_{offset}+Q_{gain}$.

There are other sources of gain error such as the relative size of the feedback capacitance. These errors will be the same for all settings. The gain errors common to all settings will result in an overall gain error, but will not result in integral non-linearity due to the accelerated ramp. The inaccuracies and non-idealities described above result in circuit area and/or power and/or cost constraints which mean this approach to Analog-Digital conversion is unattractive for modern integrated circuit implementation.

BRIEF DESCRIPTION

A new unit element approach to generating an accelerated ramp is proposed. The approach uses rotating unit elements to eliminate charge injection errors described above from causing non-linearity during an accelerated ramp. The approach also eliminates the input voltage source as a cause of non-linearity.

According to one aspect of the present invention, the step sizes are made to be linearly related by using unit cells and a single reference voltage. To achieve different step sizes, a different number of unit cells are used for each step size. Since the step size is equal to the amount of charge injected at each step, either the capacitance or voltage can be varied. It will be shown that the charge injection error makes the previous approach, stepping the voltage, impractical.

The unit element should not only contain a unit capacitor, but it should also contain its own unique unit switches. Switches may not be shared among the different unit cells, because the charge injection from the switch elements must have a unit size.

DETAILED DESCRIPTION

Persons of ordinary skill in the art will realize that the following description of the present invention is illustrative only and not in any way limiting. Other embodiments of the invention will readily suggest themselves to such skilled persons.

Figure 5:
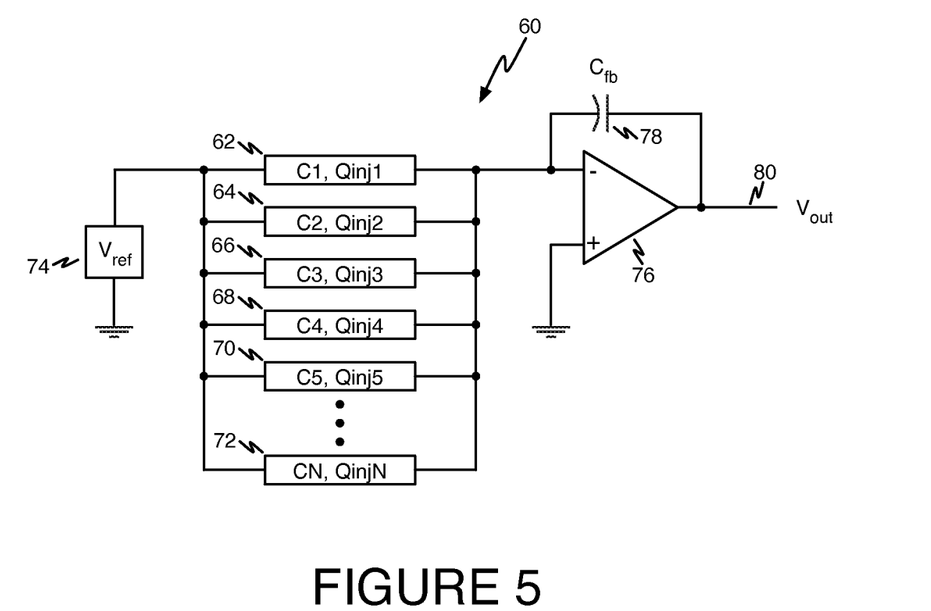
FIG. 5 is a representation of a ramp generator circuit according to one aspect of the present invention.

Referring now to FIG. 5, a block diagram shows an illustrative ramp generator circuit 60 including a plurality of unit elements 62, 64, 66, 68, 70, and 72 in accordance with another aspect of the present invention. While FIG. 5 shows six unit elements for purposes of illustration only, persons of ordinary skill in the art actual embodiments of the invention may include differing numbers of unit elements according to the needs of the particular application. Each of unit elements 62, 64, 66, 68, 70, and 72 may be configured as shown in the illustrative unit element 12 of FIG. 2.

The unit elements 62, 64, 66, 68, 70, and 72 are all coupled to $V_{ref}$ source 74 and to the inverting input of operational amplifier 76. Feedback capacitor ($C_{fb}$) 78 is coupled between the output 80 and the inverting input of operational amplifier 76.

In an illustrative embodiment of the present invention that will be used to show the operation of the present invention, sixteen unit elements are employed. A 50 fF capacitor and a 24 mV input voltage are used order to achieve a 1.2 fC step size. Since sixteen unit elements are used in this example, the step sizes for a given ramp may vary by a 16:1 ratio.

In order to generate a ramp having a unit step size, the circuit will operate by using one unit element at a time, but rotating through all sixteen of the unit elements. For example, on the first step, the capacitor in the first unit element 62 is charged, then that charge is deposited onto the input of the amplifier. The next step uses only the second unit element 64. This is followed by using one at a time the succeeding unit elements 66, 68, 70, up to and including the last (sixteenth) unit element 72. This completes a single charge cycle. After the last unit element 72 is used, the next step starts back with the first unit element 62. The foregoing description in which the unit elements 62 through 72 are used in order is illustrative only, and persons of ordinary skill in the art will appreciate that any algorithm that uses all unit elements equally within each charge cycle could be employed. Decoding and control of switches to place the unit elements in and out of the circuit is well known in the art.

Following the preceding example, the charge from the first step is $Q_{step}=V_{in}*C_1+Q_{err1}$. After sixteen steps, the total charge is $Q_{total}=V_{in}*(C_1+C_2+ \ldots +C_{16})+Q_{err1}+Q_{err2}+ \ldots +Q_{err16}$, where $Q_{err1}$ to $Q_{err16}$ represent the total error in the charge for steps 1 to 16, respectively.

The circuit of FIG. 5 may be operated to produce different step sizes. For example, a step size of 2 units may be produced by operating the unity elements in simultaneous groups of two. This step size is double the size of the unit step size described above, and employs two unit elements at a time using the same input voltage $V_{ref}$. This eliminates the error due to voltage mismatch caused by imprecise reference voltage scaling.

As in the generation of the unit step size, each of the unit elements 62 through 72 are used in a rotating fashion. In one non-limiting example, the first step may be generated using the first two unit elements together. The next step could use the third and fourth, and so on. It should be noted that after eight steps, all elements are used, whereas generating the unit step size uses all unit elements after sixteen steps.

Following this example, the charge from the first step is $Q_{step}=V_{in}*(C_1+C_2)+Q_{err1}+Q_{err2}$. After eight steps, the total charge is $Q_{total}=V_{in}*(C_1+C_2+\ldots+C_{16})+Q_{err1}+Q_{err2}+\ldots+Q_{err16}$.

Figure 7:
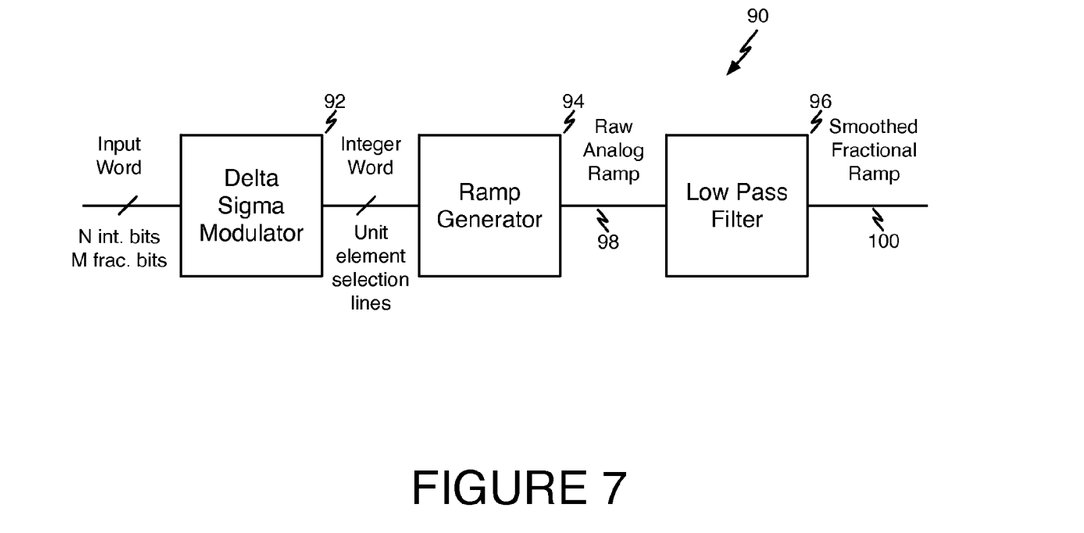
FIG. 7 is a block diagram showing a ramp generator system for generating fractional step sizes.

The step size may be doubled again by using four unit elements at a time, again by using eight unit elements at a time, and doubled one more by using all sixteen unit elements simultaneously. Each time, the same input voltage $V_{ref}$ is employed. In this example, the charge from the first step (assuming a perfect amplifier) is $Q_{step}=V_{in}*(C_1+C_2+\ldots+C_{16})+Q_{err1}+Q_{err2}+\ldots+Q_{err16}$. This sum is exactly equal to the $Q_{total}$ for the unit step size after sixteen steps, the 2× step size after eight steps, and the 4× step size after four steps.

achieved by dithering the step size. In the proposed implementation, a delta sigma modulator precedes the unit element ramp generator to facilitate fractional gains. A low pass filter follows the modulator in order to smooth out the fractional steps. A block diagram for a ramp generator system 90 for producing fractional gains is shown in FIG. 7. N integer bits and M fractional bits are input to delta-sigma modulator 92. The output of delta-sigma modulator 92 selects/enables unit elements in the ramp generator 94, which outputs a raw analog ramp signal. Low pass filter 96 smoothes the modulated ramp signal.

Table 1 illustrates this aspect of the present invention. Each box in the table represents one time slot. For simplicity, sixteen time slots are shown, but persons of ordinary skill I the art will appreciate that this aspect of the present invention is not so limited. Any number of unit elements A, B, C, and D can be turned on during each time slot. In the illustrative embodiment shown in Table 1, zero, 1, or 2 elements are turned on during each time slot. All unit elements should be used exactly once per charge cycle to preserve precise gain ratios.

TABLE 1

| | | | | | | Time Slots | | | | | | | | | | No. of elements on/ No. of time slots | Gain |
|---|---|---|---|---|---|---|---|---|---|---|---|---|---|---|---|---|---|
| 1 | 2 | 3 | 4 | 5 | 6 | 7 | 8 | 9 | 10 | 11 | 12 | 13 | 14 | 15 | 16 | | |
| A | — | — | — | B | — | — | — | C | — | — | — | D | — | — | — | 4/16 | 0.25 |
| A | — | B | — | C | — | D | — | A | — | B | — | C | — | D | — | 8/16 | 0.5 |
| A | B | C | — | D | A | B | — | C | D | A | — | B | C | D | — | 12/16 | 0.75 |
| A | B | C | D | A | B | C | D | A | B | C | D | A | B | C | D | 16/16 | 1 |
| A, B | C | D | A | B, C | D | A | B | C | D, A | B | C | D | A, B | C | D | 20/16 | 1.25 |
| A, B | C | D, A | B | C, D | A | B, C | D | A, B | C | D, A | B | C, D | A | B, C | D | 24/16 | 1.5 |
| A, B | C, D | A, B | C | D, A | B, C | D, A | B | C, D | A, B | C, D | A | B, C | D, A | B, C | D | 28/16 | 1.75 |
| A, B | C, D | A, B | C, D | A, B | C, D | A, B | C, D | A, B | C, D | A, B | C, D | A, B | C, D | A, B | C, D | 32/16 | 2 |

Figure 6:
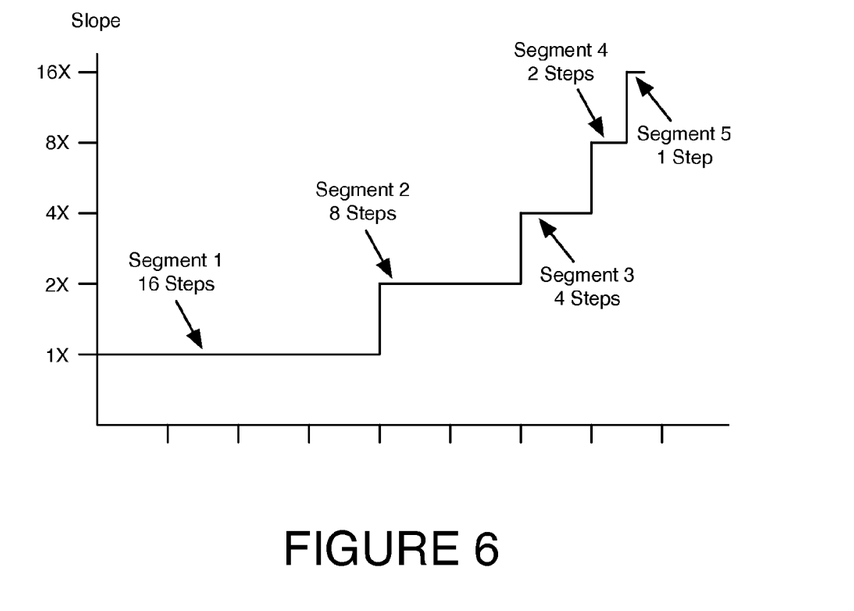
FIG. 6 is a graph illustrating the ramp slope obtained by using 1×, 2×, 4×, 8×, and 16× step sizes.

Referring now to FIG. 6, a graph illustrates the ramp slope obtained by using 1×, 2×, 4×, 8×, and 16× step sizes in operating the ramp generator 60 according to the present invention.

The overall slope of the ramp may be changed by changing the input voltage $V_{ref}$. This may be done by configuring the $V_{ref}$ source as a variable voltage source. No accurate method of scaling the input voltage is proposed here. However, it will be understood by persons of ordinary skill in the art that, even with an accurate scaled voltage, the charge errors described earlier will prevent linear scaling of the step size using a voltage-based scaling. Fortunately, the system of the present invention is tolerant to such errors between scaled ramps but is not tolerant of scale inaccuracies within an accelerated ramp. Therefore, the system of the present invention may be advantageously employed using voltage scaling to vary the ramp shape in where the system can tolerate error and using unit element scaling to scale the step size where extreme scale accuracy is required.

A major deleterious effect of charge injection is circumvented by using the charge injection method of the present invention. After 16 unit steps, the total charge injection is $Q_{inj1}+Q_{inj2}+\ldots Q_{inj16}$. This is identical to the charge injection expected if all unit elements switch at once, creating a single step. By using the same voltage for both cases, the effects of reference voltage scaling errors are also eliminated.

Figure 8:
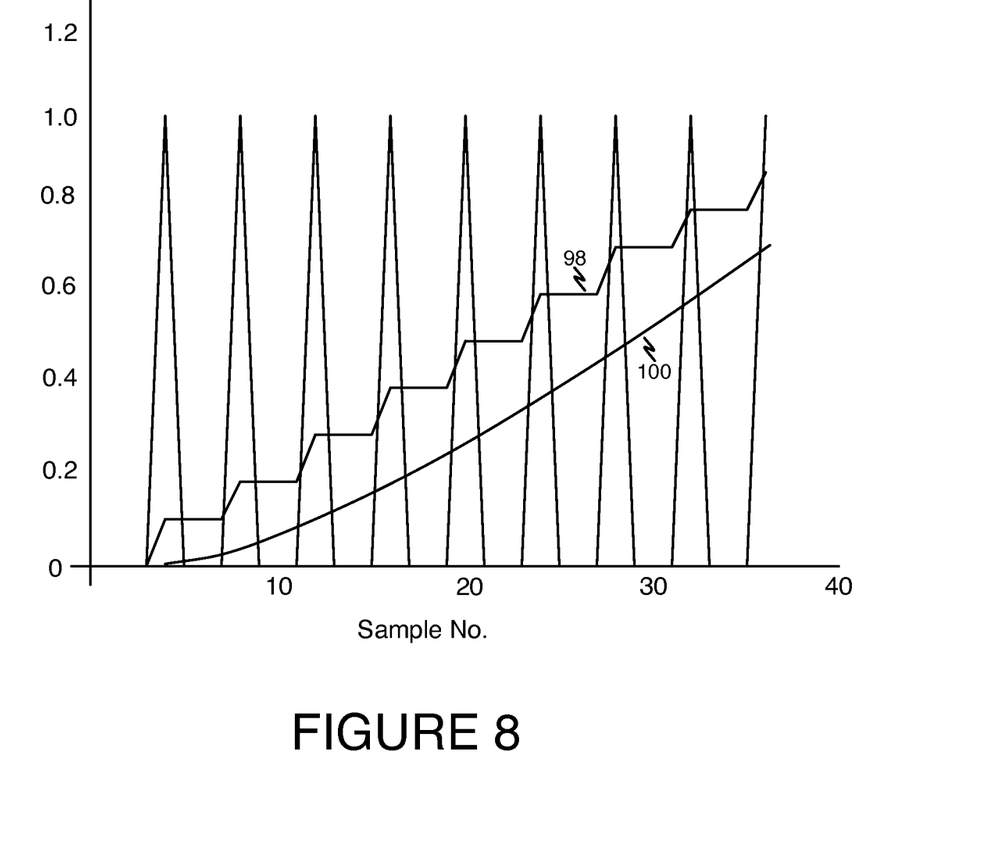
FIG. 8 is a graph showing the effects of low pass filtering on the ramp waveform.

According to another aspect of the present invention, fractional gains may be achieved. Fractional gains can be The low pass filter 96 smoothes the modulated ramp signal. FIG. 8 is a graph showing the effects of the low pass filter 96 on the ramp waveform. FIG. 8 shows a fractional step size of 0+¼. The ramp generator 94 would output a stepped waveform. After the low pass filter 96, the waveform is smoothed.

If the ratio of the ramp clock frequency to the low pass filter bandwidth is high compared to the fractional pattern length, then the error caused by the truncation in the modulator and finite number of unit elements becomes less than the desired fractional step size. In this way, the resolution of the system is increased from the nominal step size of the raw ramp generator to the fractional resolution (from N bits to N+M bits).

If the bandwidth of the low pass filter is around 3 MHz and the ramp clock frequency is greater than 100 MHz, the ratio of bandwidth to sample clock frequency is 3/100. The maximum pattern length for the 4-bit word is 16. Therefore, the ratio of the sample clock frequency to low pass filter is about 33:1. This is greater than the maximum pattern length of 16 samples. Therefore, the ramp system should operate with a resolution that approaches the fractional resolution, 16 times greater than the nominal step size.

The low pass filter may be implemented by a bandwidth-limited voltage buffer between the raw ramp generator output and the comparator 46 in FIG. 4. Implementing an amplifier with a bandwidth equal to the ramp clock frequency would actually be prohibitive due to the power required. So, the amplifier as low pass filter is advantageous to low power ramp designs.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A method for generating a ramp comprising:
   providing a DC voltage reference source;
   providing a summing amplifier;
   providing n switched capacitor elements coupled in parallel between the DC voltage reference source and the summing amplifier, where n is an integer greater than 1;
   selectively activating the switched capacitor elements to first store charge on each activated switched capacitor element and then to measure the sum of the charges on the activated capacitor switch elements in each of a fixed-integer number of non-overlapping time slots in a cyclical manner to generate a ramp, the slope of the ramp being selectable by activating from between 1 and n the number of switched capacitor elements in the non-overlapping time slots, activation of the switched capacitor elements being rotated among the n switched capacitor elements in the non-overlapping time slots.

2. The method of claim 1 wherein the switched capacitor elements are equally weighted.

3. The method of claim 1 wherein the number of time slots is $2^n$.

4. The method of claim 1 wherein an error in charge injected by each switched capacitor element is matched.

5. A ramp generator circuit comprising:
   a DC voltage reference source;
   a summing amplifier;
   n switched capacitor elements coupled in parallel between the DC voltage reference source and the summing amplifier, where n is an integer greater than 1; and
   a control circuit configured to selectively activate the switched capacitor elements to first store charge on each activated switched capacitor element and then to measure the sum of the charges on the activated capacitor switch elements in each of a fixed-integer number of non-overlapping time slots in a cyclical manner to generate a ramp, the slope of the ramp being selectable by activating from between 1 and n the number of switched capacitor elements in the non-overlapping time slots, the control circuit causing activation of the switched capacitor elements to be rotated among the n switched capacitor elements in the non-overlapping time slots.

6. The ramp generator circuit of claim 5 wherein the switched capacitor elements are equally weighted.

7. The method of claim 5 wherein the number of time slots is $2^n$.

8. The ramp generator circuit of claim 5 wherein an error in charge injected by each switched capacitor element is matched.

9. A circuit comprising:
   a DC voltage reference source;
   a summing amplifier having an input and an output;
   n switched capacitor elements coupled in parallel between the DC voltage reference source and the input of the summing amplifier, where n is an integer greater than 1;
   a control circuit configured to selectively activate a predetermined number of the switched capacitor elements to first store charge on each activated switched capacitor element and then to measure the sum of the charges on the activated capacitor switch elements in each of a fixed-integer number of non-overlapping time slots in a cyclical manner to generate a ramp, the slope of the ramp being selectable by activating from between 1 and n the number of switched capacitor elements in the non-overlapping time slots, the control circuit causing activation of the switched capacitor elements to be rotated among the n switched capacitor elements in the non-overlapping time slots; and
   a single slope analog-to-digital converter coupled to the output of the summing amplifier, the single slope analog-to-digital converter having an analog input and a digital output.

10. A circuit comprising:
    a DC voltage reference source;
    a summing amplifier having an input and an output;
    n switched capacitor elements coupled in parallel between the DC voltage reference source and the input of the summing amplifier, where n is an integer greater than 1;
    a control circuit configured to selectively activate a predetermined number of the switched capacitor elements to first store charge on each activated switched capacitor element and then to measure the sum of the charges on the activated capacitor switch elements in each of a fixed-integer number of non-overlapping time slots in a cyclical manner to generate a ramp, the slope of the ramp being selectable by activating from between 1 and n the number of switched capacitor elements in the non-overlapping time slots, the control circuit causing activation of the switched capacitor elements to be rotated among the n switched capacitor elements in the non-overlapping time slots; and
    a plurality of single slope analog-to-digital converters coupled to the output of the summing amplifier, each single slope analog-to-digital converter having an analog input and a digital output, the analog input of each single slope analog-to-digital converter coupled to a unique column output line in an imaging array.

11. The method of claim 1 wherein selectively activating the switched capacitor elements comprises selectively activating the same number of switched capacitor elements in each time slot.

12. The method of claim 1 wherein selectively activating the switched capacitor elements comprises selectively activating a different number of switched capacitor elements in some of the time slots.

13. A method for generating a ramp comprising:
    providing a DC voltage reference source;
    providing a summing amplifier;
    providing n switched capacitor elements coupled in parallel between the DC voltage reference source and the summing amplifier, where n is an integer greater than 1;
    selectively activating a group of the switched capacitor elements to first store charge on each activated switched capacitor element and then to measure the sum of the charges on the activated capacitor switch elements in each of a fixed-integer number of non-overlapping time slots to generate a ramp, the slope of the ramp being selectable by including in the group between 1 and n the number of switched capacitor elements, different ones of the switched capacitor elements being included in the group in adjacent ones of the non-overlapping time slots.

14. The method of claim 13 wherein the group of switched capacitor elements comprises the same number of switched capacitor elements in each time slot.

15. The method of claim 14 wherein each of the switched capacitor elements is included in the group at least once over the fixed-integer number of non-overlapping time slots.

16. The method of claim 13 wherein the group of switched capacitor elements comprises a first number of switched capacitor elements in first ones of the time slots and a second number of switched capacitor elements different from the first number in second ones of the time slots.

\* \* \* \* \*